(12) United States Patent
Kim et al.

(10) Patent No.: US 7,772,770 B2
(45) Date of Patent: Aug. 10, 2010

(54) FLAT DISPLAY PANEL AND FLAT PANEL DISPLAY DEVICE HAVING THE SAME

(75) Inventors: Jong-Jin Kim, Suwon-si (KR); Jeong-No Lee, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1250 days.

(21) Appl. No.: 11/212,771

(22) Filed: Aug. 29, 2005

(65) Prior Publication Data
US 2006/0050221 A1  Mar. 9, 2006

(30) Foreign Application Priority Data
Sep. 8, 2004 (KR) .................. 10-2004-0071589

(51) Int. Cl.
*H01J 1/62* (2006.01)
(52) U.S. Cl. ...................... 313/512; 313/504
(58) Field of Classification Search ............ 349/58, 349/60, 149, 150, 153, 122, 158; 313/500, 313/504, 505, 510, 512
See application file for complete search history.

(56) References Cited

U.S. PATENT DOCUMENTS

| 6,172,730 | B1 | 1/2001 | Fujita | |
| 6,177,971 | B1 * | 1/2001 | Jung et al. | 349/60 |
| 6,624,572 | B1 * | 9/2003 | Kim et al. | 313/512 |
| 6,797,615 | B1 * | 9/2004 | Lous et al. | 438/666 |
| 7,304,699 | B2 * | 12/2007 | Ikeda et al. | 349/106 |
| 2002/0097367 | A1 * | 7/2002 | Hirabayashi | 349/149 |

FOREIGN PATENT DOCUMENTS

| CN | 1412609 | 4/2003 |
| JP | 01-142534 | 6/1989 |
| JP | 01-298318 | 12/1989 |
| JP | 08-179350 | 7/1996 |
| JP | 09-022000 | 1/1997 |
| JP | 09-033898 | 2/1997 |

(Continued)

OTHER PUBLICATIONS

*Office Action* from the Chinese Patent Office issued in Applicant's corresponding Chinese Patent Application No. 2005-10103701.9 dated Jan. 11, 2008.

(Continued)

*Primary Examiner*—David Nelms
*Assistant Examiner*—Tai Duong
(74) *Attorney, Agent, or Firm*—Robert E. Bushnell, Esq.

(57) ABSTRACT

A flat display panel is constructed in such a manner that weak impact resistance of a substrate, due to a step difference present on the flat display panel, is prevented. The flat display panel includes: a substrate; a facing member bonded to the substrate, and having a surface area smaller than that of the substrate; a display unit disposed between the substrate and the facing member; a bonding unit which bonds the substrate and the facing member, and which is interposed between the substrate and the facing member along outer sides of the display unit; and a buffer member included on outer sides of the bonding unit of the substrate.

12 Claims, 6 Drawing Sheets

FOREIGN PATENT DOCUMENTS

| | | | |
|---|---|---|---|
| JP | 09-081051 | | 3/1997 |
| JP | 10-254377 | | 9/1998 |
| JP | 11-338368 | | 12/1999 |
| JP | 2000-171820 | | 6/2000 |
| JP | 2002-343950 | | 11/2002 |
| JP | 2003-131198 | | 5/2003 |
| JP | 2004-134099 | | 4/2004 |
| JP | 2004-219903 | * | 8/2004 |
| JP | 2004-227851 | | 8/2004 |

OTHER PUBLICATIONS

Korean Office Action of the Korean Patent Application No. 2004-71589, issued on Apr. 26, 2006.

*Office Action* from the Japanese Patent Office issued in Applicant's corresponding Japanese Patent Application No. 2005-179935 dated Jan. 8, 2008.

*Office Action* from the Japanese Patent Office issued in Applicant's corresponding Japanese Patent Application No. 2005-179935 dated Aug. 12, 2008.

"Certificate of Patent for Invention" issued by Chinese Patent Office on Mar. 11, 2009 for Applicant's corresponding Chinese Patent Application No. 20051013701.9.

\* cited by examiner

FLAT DISPLAY PANEL AND FLAT PANEL DISPLAY DEVICE HAVING THE SAME

CLAIM OF PRIORITY

This application makes reference to, incorporates the same herein, and claims all benefits accruing under 35 U.S.C. §119 from an application filed in the Korean Intellectual Property Office on Sep. 8, 2004 and there duly assigned Serial No. 10-2004-0071589.

BACKGROUND OF THE INVENTION

1. Technical Field

The present invention relates to a flat display panel and a flat panel display device having the same and, more particularly, to a flat display panel in which the weak impact resistance of a substrate due to a step difference can be compensated, and a flat panel display device having the same.

2. Related Art

Flat panel display devices display images on a flat substrate such as a liquid crystal display (LCD) device, an organic light emitting display (OLED) device, or an inorganic light emitting device.

A flat panel display device is generally composed of a pair of substrates, edge parts of which are bonded to each other, and a pad unit having a plurality of terminals and exposed outwardly. Internal circuits of the flat panel display device are connected to external electronic devices through the terminals in the pad unit, the terminals being bonded to a flexible printed circuit board (PCB).

The sizes of the two substrates must be different since the pad unit is formed on one of the two substrates. Therefore, a predetermined step difference is present on portions corresponding to the pad unit on the flat display panel.

The substrate on which the pad unit is formed is supported by a support member such as a bracket. When the substrate on which the pad unit is not formed is also supported by the support member, a predetermined space between the support member and this substrate is present due to a step difference on portions on the other substrate where the pad unit is located.

The portions of the substrate located in correspondence to the predetermined space have a low resistance to an external impact.

The portions of the substrate on which step differences are formed, besides the portions on which the pad unit are formed, also have a low resistance to an external impact.

SUMMARY OF THE INVENTION

The present invention provides a flat panel display device in which a weak impact resistance of a substrate, due to a step differences formed on a flat display panel, can be prevented.

According to an aspect of the present invention, there is provided a flat display panel comprising: a substrate; a facing member bonded to the substrate, and having a smaller surface area than the substrate; a display unit disposed between the substrate and the facing member; a bonding unit which bonds the substrate and the facing member, and which is interposed between the substrate and the facing member along outer sides of the display unit; and a buffer member included on outer sides of the bonding unit of the substrate.

According to an aspect of the present invention, there is provided a flat display panel comprising: a pair of substrates, the surface areas of which are different, the substrates being bonded to face each other; a display unit disposed between the substrates; a bonding unit which bonds the pair of substrates, and which is disposed on an outer side of the display unit; and a planarizing member which approximately planarizes at least a portion of the step difference resulting from the surface area difference of the substrates, and which is disposed on an outer side of the bonding unit.

According to an aspect of the present invention, there is provided a flat display device comprising: a flat display panel which displays predetermined images, and which has at least a step difference; a support member which supports the flat display panel; and a buffer member interposed between the support member and at least a step difference of the flat display panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings in which exemplary embodiments of the invention are shown.

Figure 1:
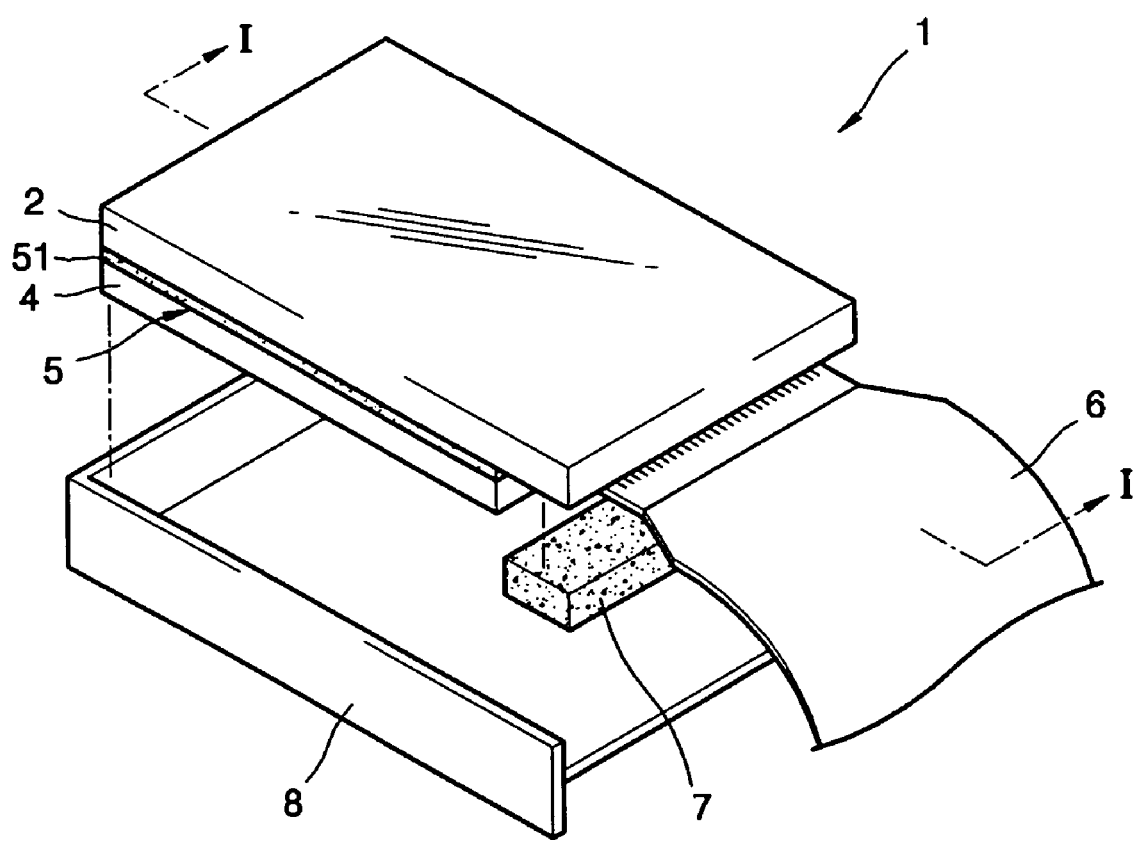
FIG. 1 is an exploded perspective view of an OLED device used as a flat panel display device according to a first embodiment of the present invention.
Figure 2:
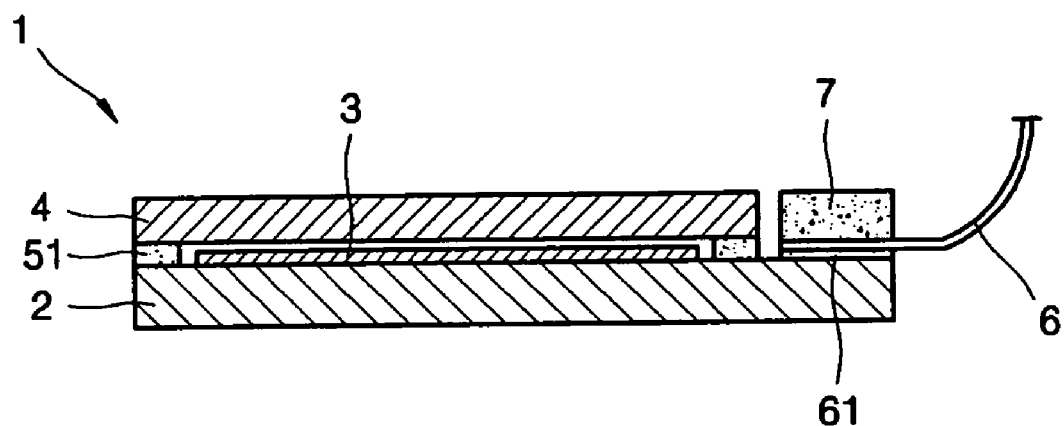
FIG. 2 is a cross-sectional view of a panel of the OLED device of FIG. 1.
Figure 3:
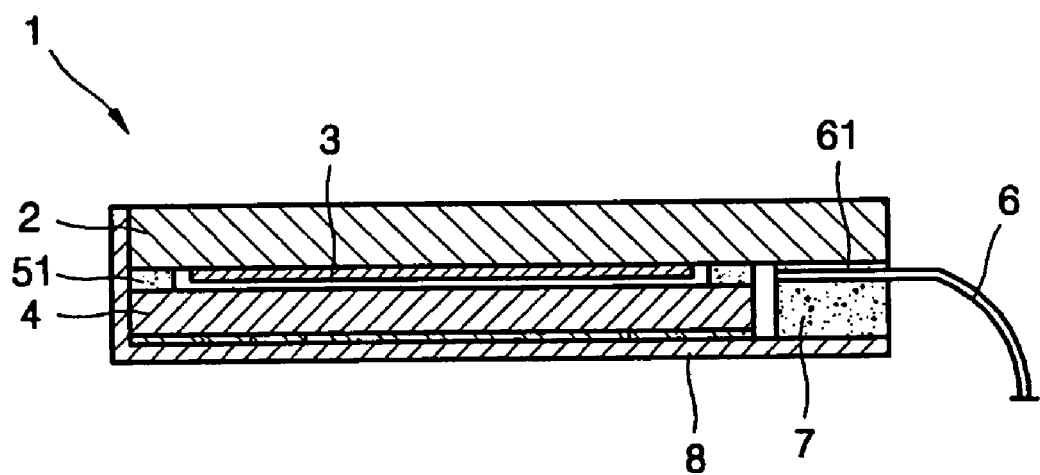
FIG. 3 is a cross-sectional view taken along line I-I of FIG. 1.
Figure 4:
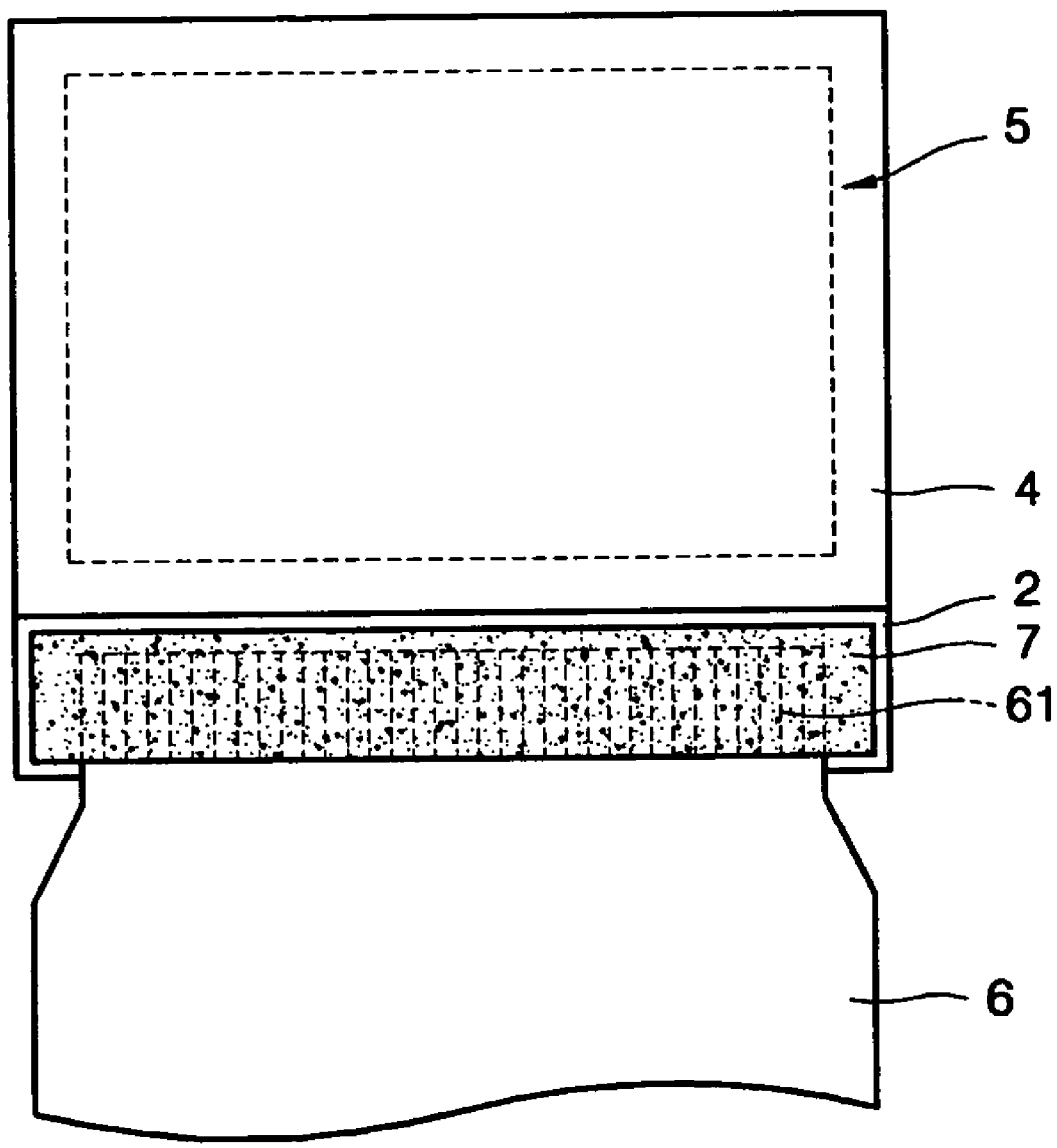
FIG. 4 is a plan view of the panel of FIG. 2.
Figure 5:
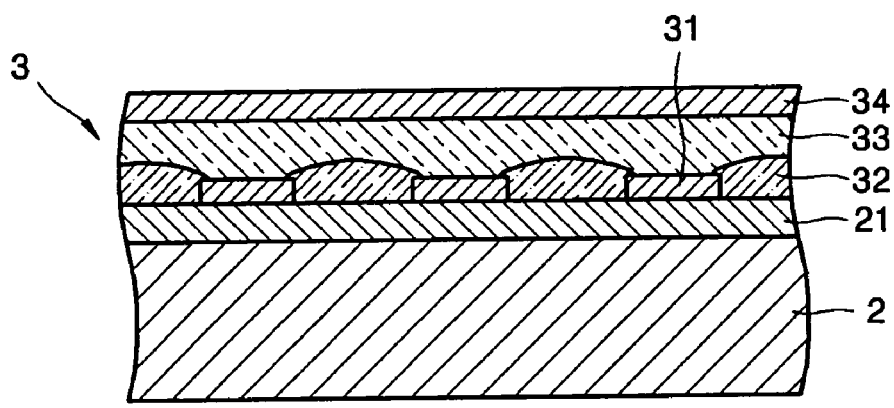
FIG. 5 is a cross-sectional view of an example of the OLED device of FIG. 1.
Figure 6:
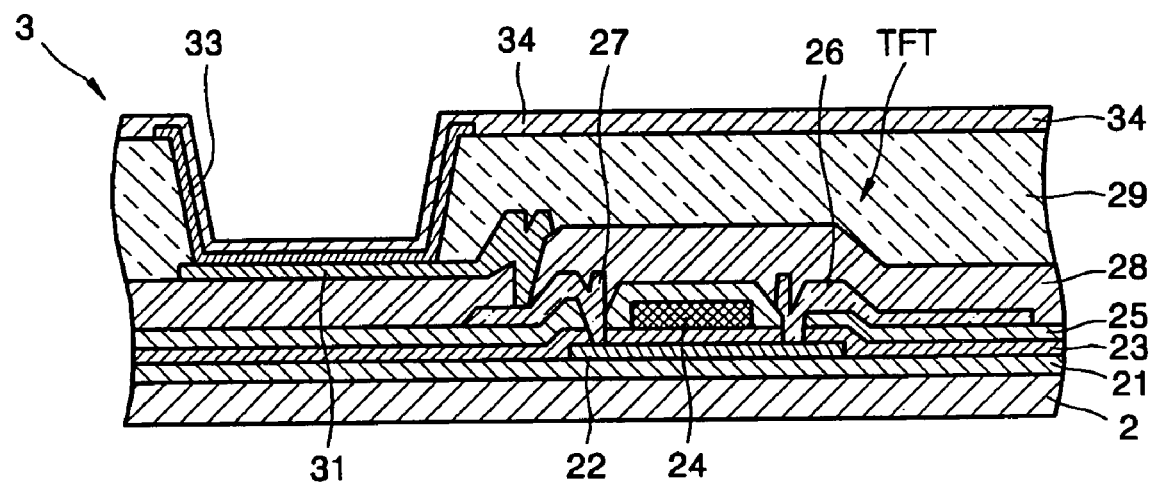
FIG. 6 is a cross-sectional view of another example of the OLED device of FIG. 1.

FIG. 1 is an exploded perspective view of an OLED device used as a flat panel display device according to a first embodiment of the present invention; FIG. 2 is a cross-sectional view of a panel of the OLED device of FIG. 1; FIG. 3 is a cross-sectional view taken along line I-I of FIG. 1; FIG. 4 is a plan view of the panel of FIG. 2; FIG. 5 is a cross-sectional view of an example of the OLED device of FIG. 1; and FIG. 6 is a cross-sectional view of another example of the OLED device of FIG. 1.

Referring to FIGS. 1 thru 4, an organic light emitting display (OLED) device includes an organic light emitting unit 3 (see FIGS. 3, 5, and 6) which includes an organic light emitting element and a facing member 4 which seals the organic light emitting unit 3 on a substrate 2.

The substrate can be a transparent glass material, such as acryl, polyimide, polycarbonate, polyester, mylar, or other plastic materials.

The organic light emitting unit 3 for displaying predetermined images is formed on the substrate 2 and has an organic light emitting element.

The organic light emitting element included in the organic light emitting unit 3 can be formed in various configurations, that is, it can be a passive matrix (PM) type organic light emitting element (i.e., a simple matrix type) or an active matrix type organic light emitting element which includes a TFT layer.

Referring to FIG. 5, a buffer layer 21 formed of SiO2, a first electrode layer 31 in a predetermined form, an organic layer 33, and a second electrode layer 34 are sequentially formed on the substrate 2. An insulating layer 32 can be interposed between the first electrode layers 31, and the second electrode layer 34 can be patterned so as to have a pattern perpendicular to the pattern of the first electrode layer 31. Although it is not shown in FIG. 5, an additional insulating layer perpendicular to the first electrode layer 31 can be included for the purpose of patterning the second electrode layer 34.

The organic layer 33 can be a low molecular weight organic layer or a polymer layer. When the organic layer 33 is a low molecular weight film, the organic layer 33 may be a Hole Injection Layer (HIL), a Hole Transport Layer (HTL), an Emission Layer (EML), an Electron Transport Layer (ETL), an Electron Injection Layer (EIL), or a combination of these layers, and can be composed of copper phthalocyanine (CuPc), N,N'-Di(naphthalene-1-yl)-N,N'-diphenyl-benzidine (NPB), or tris-8-hydroxyquinoline aluminum (Alq3). The low molecular weight organic film can be formed using an evaporation method.

If the organic layer 33 is a polymer organic film, the organic layer 33 can be an HTL or an EML. The HTL can be formed of poly-(2,4)-ethylene-dihydroxy thiophene (PEDOT), and the EML can be formed of Poly-Phenylenevinylene (PPV), Soluble PPV's, Cyano-PPV, or Polyfluorene, and can be formed using screen printing or inkjet printing.

The first electrode layer 31 functions as an anode and the second electrode layer 34 functions as a cathode. Of course, the polarity of the first and second electrode layers can be reversed.

The first electrode layer 31 can be used as a transparent electrode or as a reflection electrode. When the first electrode layer 31 is used as a transparent electrode, the first electrode layer 31 can be formed of ITO, IZO, ZnO or $In_2O_3$.

When the first electrode layer 31 is used as a reflection electrode, the first electrode layer 31 can be formed of ITO, IZO, ZnO or $In_2O_3$ on a reflection film after forming the reflection film using Ag, Mg, Al, Pt, Pd, Au, Ni, Nd, Ir, Cr, or a compound of these metals.

The second electrode layer 34 can also be used as a transparent electrode or a reflection electrode. When the second electrode layer 34 is used as a transparent electrode, an auxiliary electrode layer or a bus electrode line formed of the same material as the transparent electrode, such as ITO, IZO, ZnO or $In_2O_3$, can be included on a material layer after depositing the material layer formed of a metal having a low work function, such as Li, Ca, LiF/Ca, LiF/Al, Al, Ag, Mg, or a compound of these metals, so as to face the organic layer 33 since the second electrode layer 34 is used as the cathode. When the second electrode layer 34 is used as a reflection electrode, the second electrode layer 34 is formed by entirely depositing Li, Ca, LiF/Ca, LiF/Al, Al, Ag, Mg, or a compound of these metals.

FIG. 6 is a cross-sectional view of another example of the OLED device of FIG. 1, and specifically, an AM type organic light emitting unit. Each of the pixels in the organic light emitting unit 3 has a TFT structure, as depicted in FIG. 6, and an organic light emitting element which is a light emission element.

The present invention is not limited to the structure of the TFT depicted in FIG. 6. The AM type organic light emitting unit of FIG. 6 will now be described in detail.

Referring to FIG. 6, a buffer layer 21 formed of $SiO_2$ is disposed on a glass substrate 2, and a TFT having the above-described structure is disposed on a buffer layer 21.

The TFT comprises an active layer 22, a gate insulating film 23, and a gate electrode 24 sequentially formed on the buffer layer 21.

The active layer 22 can be formed of an amorphous silicon thin film or a poly silicon thin film, but it is not limited thereto. An organic semiconductor layer can also be used. The semiconductor active layer has source and drain regions which are highly doped with an N type or P type dopant.

The gate insulating film 23, formed of $SiO_2$, is disposed on the active layer 22, and the gate electrode 24, which is a conductive film formed of MoW or Al/Cu, is formed on a predetermined region of the gate insulating film 23. The gate electrode 24 is connected to a gate line that applies an ON/OFF signal to the TFT. The region on which the gate electrode 24 is formed corresponds to a channel region of the active layer 22.

An inter-insulator 25 is formed on the gate insulating film 23, and a source electrode 26 and a drain electrode 27 are each formed so as to contact the source and drain regions, respectively, of the active layer 22 through contact holes.

A passivation film 28, formed of $SiO_2$, is formed on the source electrode 26 and drain electrode 27, and a planarizing film 29 formed of acryl or polyimide is formed on the passivation film 28.

Although not shown in the drawing, at least one capacitor is connected to the TFT. A circuit which includes the TFT is not limited to the circuit depicted in FIG. 6.

The drain electrode 27 is connected to the first electrode layer 31, which functions as the anode of an organic light emitting element. The first electrode layer 31 is formed on the passivation film 28, and a pixel defining film 29, which is an insulating film, is formed on the passivation film 28. The organic light emitting element of FIG. 6 is formed after forming a predetermined opening in the pixel defining film 29.

The organic light emitting element displays predetermined image information by generating lights of red, green, and blue colors according to a current flow, and comprises a first electrode layer 31 which receives positive power from the drain electrode 27, a second electrode layer 34 which covers all pixels and which supplies negative power to the pixels, and an organic layer 33 which generates light and which is disposed between the first electrode layer 31 and the second electrode layer 34.

The material for forming the first electrode layer 31 and the first electrode layer 31 can be the same as the material for forming the PM organic light emitting unit.

As described above, the organic light emitting unit 3 formed on the substrate 2 is sealed by a facing member 4, as depicted in FIG. 3. The facing member 4 can be formed of glass or plastic material as is the substrate 2, and can also be formed of a metal cap.

The substrate 2 and the facing member 4 are bonded by a sealant 51. The sealant 51 is coated on edges of the facing member 4 on an outer side of the organic light emitting unit 3, and, as depicted in FIGS. 1 through 4, the facing member 4 on which the sealant 51 is coated is bonded to the substrate 2. The portion on which the sealant 51 is formed forms a bonding portion which bonds the substrate 2 and the facing member 4.

As depicted in FIGS. 2 through 4, a pad unit 61 exposed to an outer side of the facing member 4 is disposed at least on an edge of the substrate 2. A plurality of terminals (not shown) is disposed in the pad unit 61, and a flexible PCB 6 is connected to the terminals.

In the present invention, the weak impact resistance of the substrate 2 at portions where step differences are present is compensated by attaching a buffer member 7 on these portions. That is, as depicted in FIGS. 2 and 3, a space between the substrate 2 and the support member 8 is filled by attaching the buffer member 7 to the flexible PCB 6 when the support member 8 is mounted on the panel 1 so as to face the facing member 4, thereby compensating for the weak impact resistance of the substrate 2.

As depicted in FIG. 4, the buffer member 7 may be formed so as to cover the entire surface of the pad unit 61, and the thickness of the buffer member 7 may be greater than the sum of the thicknesses of the facing member 4 and the sealant 51. This is for the purpose of making the buffer member 7 contact the support member 8 closely when the panel 1 is mounted on the support member 8.

The buffer member 7 can be made of any material as long as it can support the substrate 2 when it is disposed as shown in the FIG. 3. The buffer member 7 can be a material that can absorb an impact, such as a polymer, but is not limited thereto, and can also be silicon or a metal.

Figure 7:
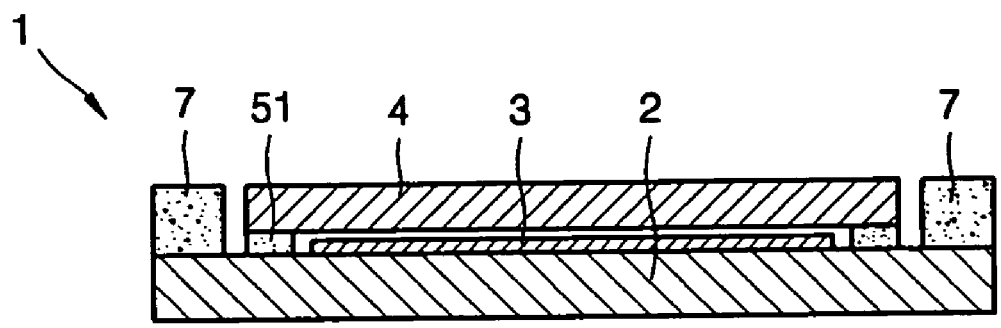
FIG. 7 is a cross-sectional view of a flat display panel according to a second embodiment of the present invention.

As depicted in FIG. 2, the entire surface of the panel 1 can be planarized by the buffer member 7. Therefore, the buffer member 7, as depicted in FIG. 7, can be attached to a portion where the step difference is formed besides attaching it to the portion where the pad unit 61 is formed, as depicted in FIGS. 1 through 4.

Figure 8:
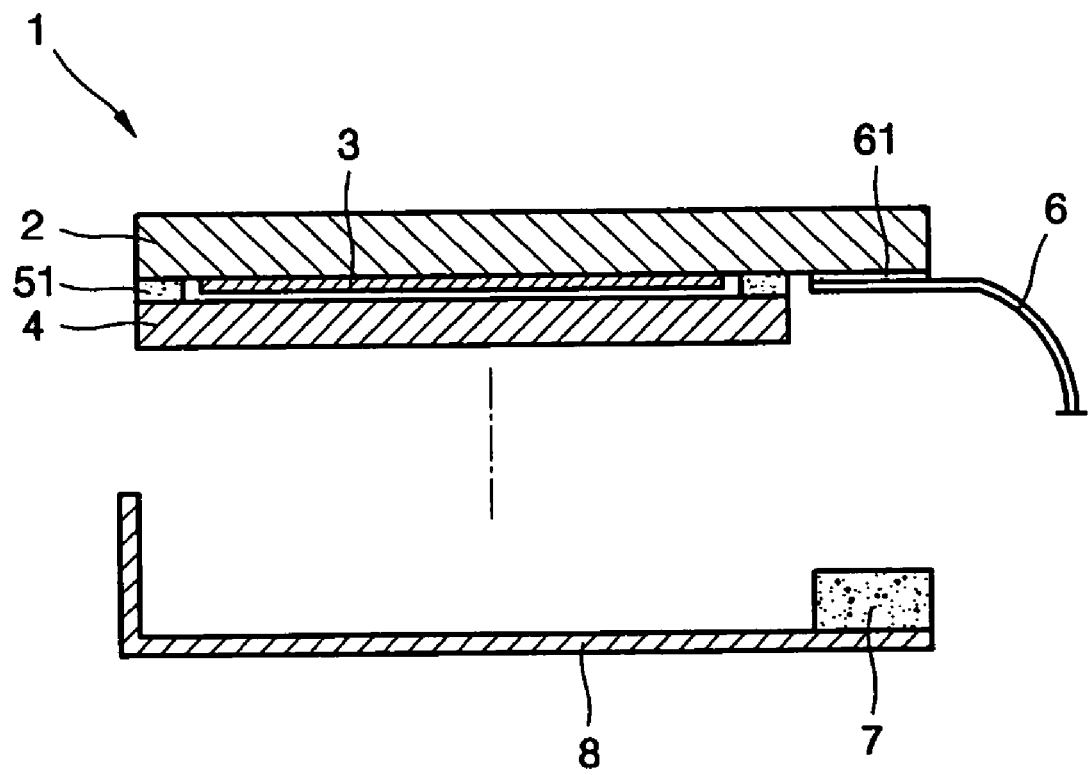
FIG. 8 is a cross-sectional view of a flat display panel according to a third embodiment of the present invention.

Also, as depicted in FIG. 8, the buffer member 7 can be attached to a portion corresponding to the support member 8.

In addition, the buffer member 7 can be formed in a particular shape as described in the above embodiments, but the present invention is not limited thereto, and can be formed of a coating material.

Figure 9:
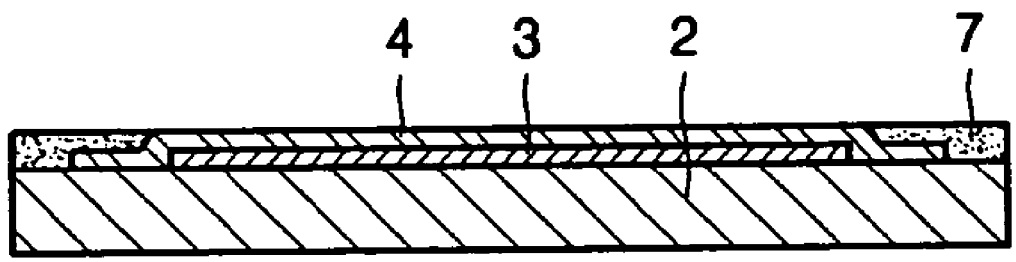
FIG. 9 is a cross-sectional view of a flat display panel according to a fourth embodiment of the present invention.

That is, as depicted in FIG. 9, if the facing member 4 which seals the organic light emitting unit 3 is in a film shape, the buffer member 7 can be coated on an edge portion of the facing member 4 by plating.

The embodiments of the present invention are not limited to organic light emitting display devices, but they can be applied to various display devices, such as LCD devices, inorganic light emitting display devices, and electron emission display devices.

The panel according to the present invention improves the impact resistance of the panel since the step difference formed in the flat display panel is removed.

Also, the panel can be safely supported when the panel is bonded to a support member, like a bracket.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A flat display panel, comprising:
    a substrate;
    a facing member bonded to the substrate and having a surface area smaller than a surface area of the substrate;
    a display unit disposed between the substrate and the facing member;
    a bonding unit which bonds the substrate and the facing member, and which is interposed between the substrate and the facing member along outer sides of the display unit;
    a buffer member disposed on outer sides of the bonding unit, said buffer member having a thickness that is greater than a sum of thicknesses of the facing member and the bonding unit; and
    a pad unit which includes a plurality of terminals exposed to an outer side of the facing member, and which is disposed on an edge of the substrate, the pad unit being connected to a flexible printed circuit board (PCB) and the buffer member being disposed on the flexible PCB;
    the buffer member being disposed on the pad unit.

2. The flat display panel of claim 1, wherein the buffer member planarizes a surface of the flat display panel.

3. The flat display panel of claim 1, comprised of the buffer member substantially planarizing the surface area of the facing member in at least a portion of a step difference neighboring the facing member and formed due to a surface area difference between of the substrate and the facing member.

4. The flat display panel of claim 1, comprised of the buffer member providing a surface area that together with the surface area of the facing member, forms a planar surface.

5. A flat display device, comprising:
    a flat display panel which displays predetermined images, and which has a step difference, the flat display panel comprised of a substrate providing a first major surface area terminating one extremity of the flat panel display and bearing a light emitting unit, and a facing member encasing the light emitting unit against the substrate and providing a second major surface area smaller than the first major surface area, the step difference being created by the second major surface area being smaller than said first major surface area;
    a support member which supports the flat display panel; and
    a buffer member having a thickness greater than a thickness of the facing member, said buffer member being interposed between the support member and said step difference of the flat display panel, and being interposed between the support member and a portion of the flat display panel that does not contact the support member, said buffer member extending in a first direction along an outer edge of the substrate within the step difference and toward the light emitting unit to substantial planarize at least a portion of the step difference and extending in a second direction normal to the first direction between the substrate and the support member along an entirety of the flat panel display not comprised of the substrate.

6. The flat display device of claim 5, wherein the facing member is bonded so as to face the substrate.

7. The flat display device of claim 6, wherein the flat display panel is disposed so that the facing member faces the support member.

8. The flat display device of claim 6, further comprising a pad unit which includes a plurality of terminals exposed on an outer side of the facing member, and which is disposed on an edge of the substrate;
    wherein the buffer member is disposed on the pad unit.

9. The flat display device of claim 8, wherein the pad unit is connected to a flexible printed circuit board (PCB), and the buffer member is disposed on the flexible PCB.

10. The flat display panel of claim 5, wherein:
- a bonding unit disposed in the step difference on an outer side of the display panel; and
- the buffer member having a thickness greater than a sum of a thickness of the facing member and the bonding unit.

11. The flat display device of claim 5, comprised of the buffer member having a thickness greater than the entirety of the flat panel display not comprised of the substrate.

12. The flat display device of claim 5, comprised of:
- a bonding unit which bonds the substrate and the facing member, and which is disposed in the step difference on an outer side of the display panel; and
- the buffer member having a thickness greater than a sum of a thickness of the facing member and the bonding unit.

* * * * *